US008242225B2

(12) United States Patent
Lee et al.

(10) Patent No.: US 8,242,225 B2
(45) Date of Patent: Aug. 14, 2012

(54) OPTICAL FILM, PROTECTION FILM POLARIZER FILM, POLARIZER PLATE FABRICATED THEREFORM, AND DISPLAY DEVICE EMPLOYING THEROF

(75) Inventors: Nam-Jeong Lee, Daejeon (KR); Bae-Kun Shin, Incheon (KR); Ki-Su Ro, Daejeon (KR); Byoung-Ho Jeon, Daejeon (KR); Beom-Seok Kim, Daejeon (KR); Dong-Man Cho, Daejeon (KR); Sung-Hyun Nam, Daejeon (KR); Eun-Mi Seo, Daejeon (KR); Kyung-Seop Noh, Daejeon (KR); Yoo-Young Jung, Ansan-si (KR); Won-Hee Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 327 days.

(21) Appl. No.: 12/451,674

(22) PCT Filed: May 23, 2008

(86) PCT No.: PCT/KR2008/002911
§ 371 (c)(1),
(2), (4) Date: Nov. 24, 2009

(87) PCT Pub. No.: WO2008/147081
PCT Pub. Date: Dec. 4, 2008

(65) Prior Publication Data
US 2010/0165263 A1 Jul. 1, 2010

(30) Foreign Application Priority Data

May 25, 2007 (KR) .......................... 10-2007-0050754
Sep. 3, 2007 (KR) .......................... 10-2007-0089138

(51) Int. Cl.
*C08F 118/02* (2006.01)
*C08F 220/10* (2006.01)
*C08F 20/06* (2006.01)
*G02F 1/1335* (2006.01)
*G02B 1/08* (2006.01)

(52) U.S. Cl. .................. 526/319; 526/318.45; 526/181; 526/329; 349/96; 359/485.01

(58) Field of Classification Search .................. 526/319, 526/272, 318.45, 318.25, 100, 329, 18; 349/96; 359/485.01
See application file for complete search history.

(56) References Cited

U.S. PATENT DOCUMENTS

| 5,914,073 A | 6/1999 | Kobayashi et al. |
| 7,153,918 B2 * | 12/2006 | Wu et al. ...................... 526/308 |
| 2005/0065252 A1 | 3/2005 | Kawamura et al. |
| 2005/0119418 A1 | 6/2005 | Matsumoto et al. |
| 2006/0017767 A1 * | 1/2006 | Matsuzawa et al. ............ 347/21 |

FOREIGN PATENT DOCUMENTS

EP 283972 A2 * 9/1988

(Continued)

*Primary Examiner* — Michael M Bernshteyn
(74) *Attorney, Agent, or Firm* — McKenna Long & Aldridge LLP

(57) ABSTRACT

The present invention provides an optical film including a copolymer that includes (a) an alkene monomer, (b) an acrylate monomer, and (c) at least one of an unsaturated organic acid monomer and an unsaturated acid anhydride monomer having one or more double bonds, a protective film for a polarizer film, and a polarizer plate and an image display device using the same.

16 Claims, 9 Drawing Sheets

FOREIGN PATENT DOCUMENTS

| | | |
|---|---|---|
| EP | 1 930 748 A1 | 11/2008 |
| JP | 01156309 A * | 6/1989 |
| JP | 04-328148 A | 11/1992 |
| JP | 2001-343529 A | 12/2001 |
| JP | 2003-155309 | 5/2003 |
| JP | 2004-217792 A | 8/2004 |
| JP | 2006-215463 | 8/2006 |
| JP | 2006-215465 | 8/2006 |
| JP | 2006-243681 | 9/2006 |
| JP | 2006-259622 A | 9/2006 |
| JP | 2006-284881 | 10/2006 |
| JP | 2006-284882 | 10/2006 |
| JP | 2007-017555 | 1/2007 |
| KR | 10-1997-0011912 | 3/1997 |
| KR | 10-2004-0097243 | 11/2004 |
| KR | 10-2005-0026869 | 3/2005 |
| WO | WO 2007/026659 | 3/2007 |
| WO | WO 2007026659 A1 * | 3/2007 |

* cited by examiner

[Fig. 1]
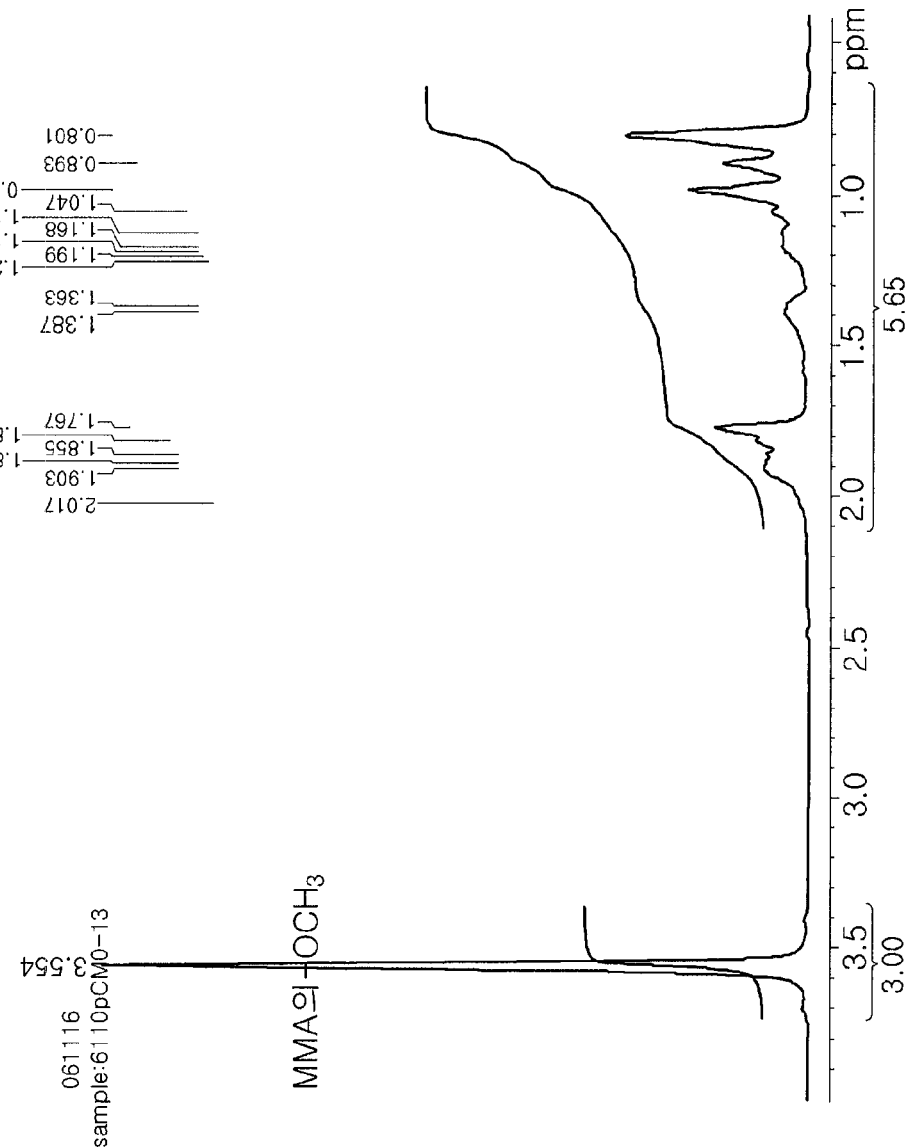

[Fig. 2]
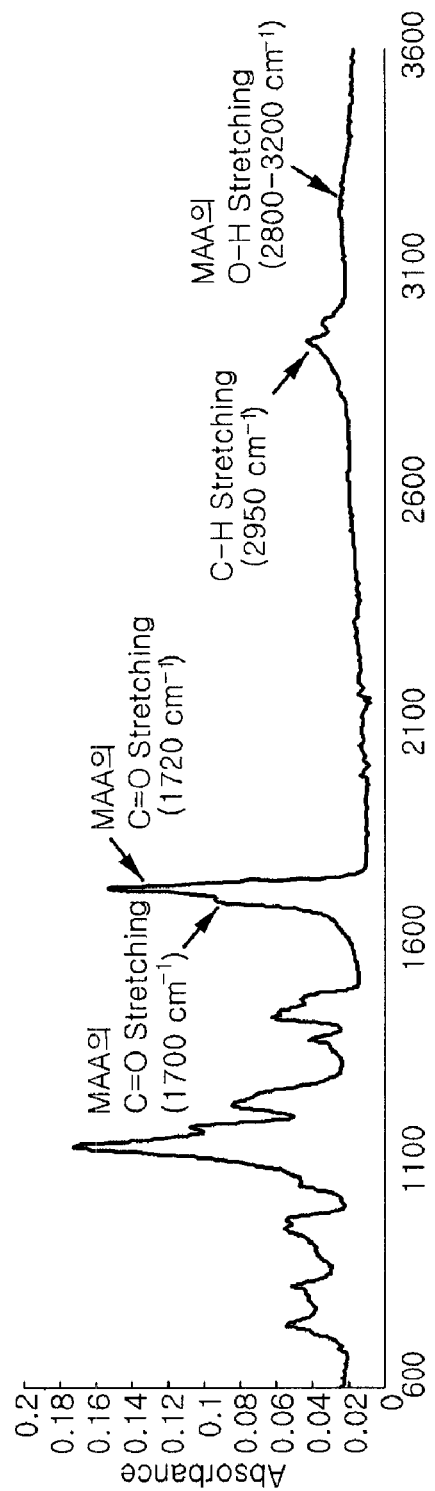

[Fig. 3]
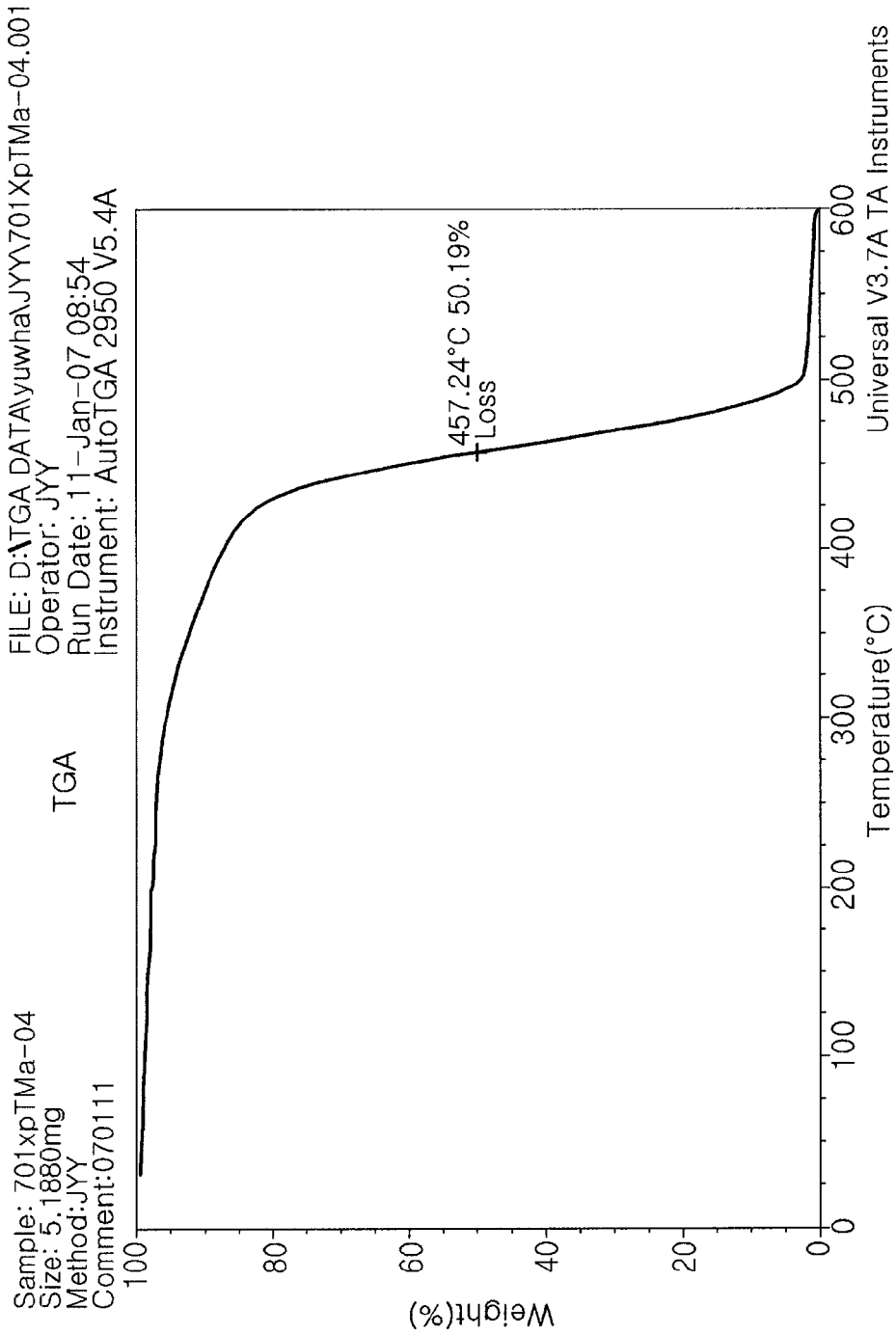

[Fig. 4]
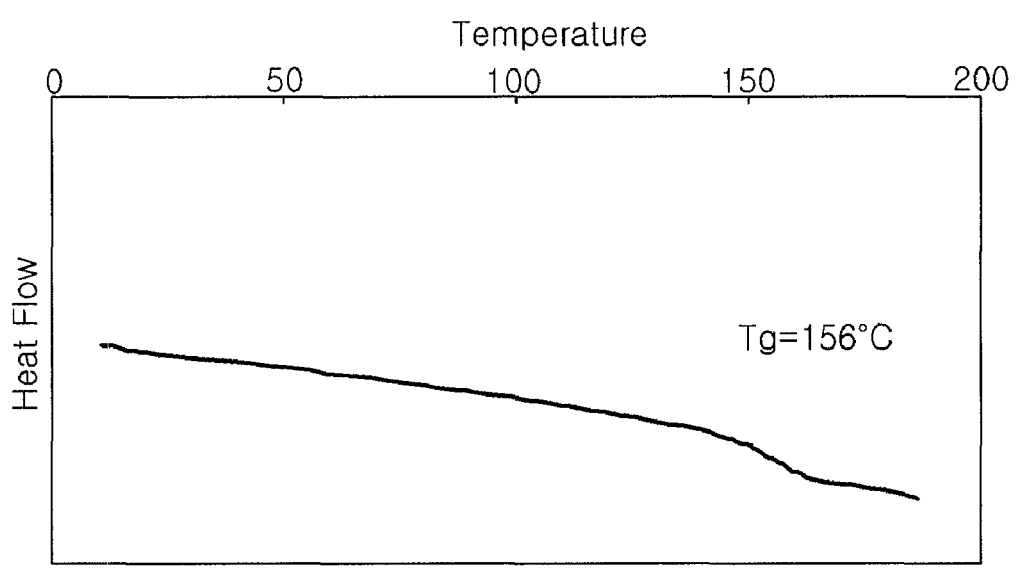

[Fig. 5]
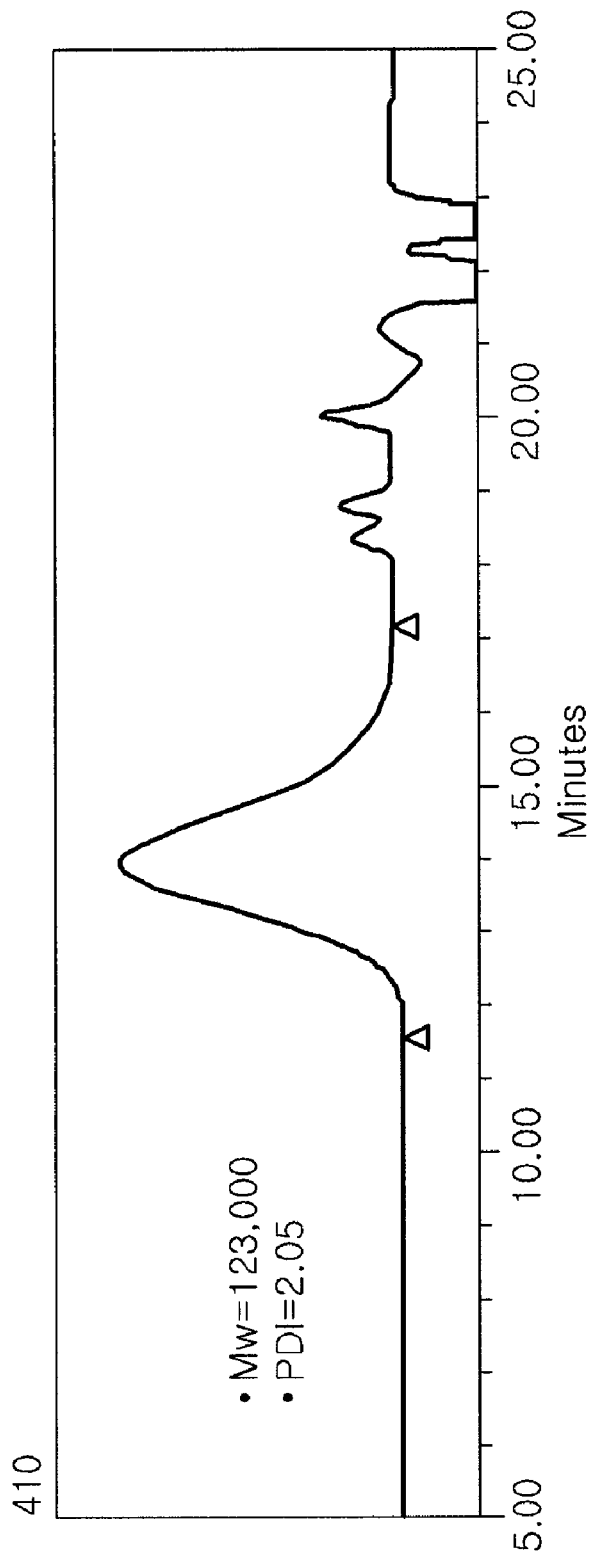

[Fig. 6]
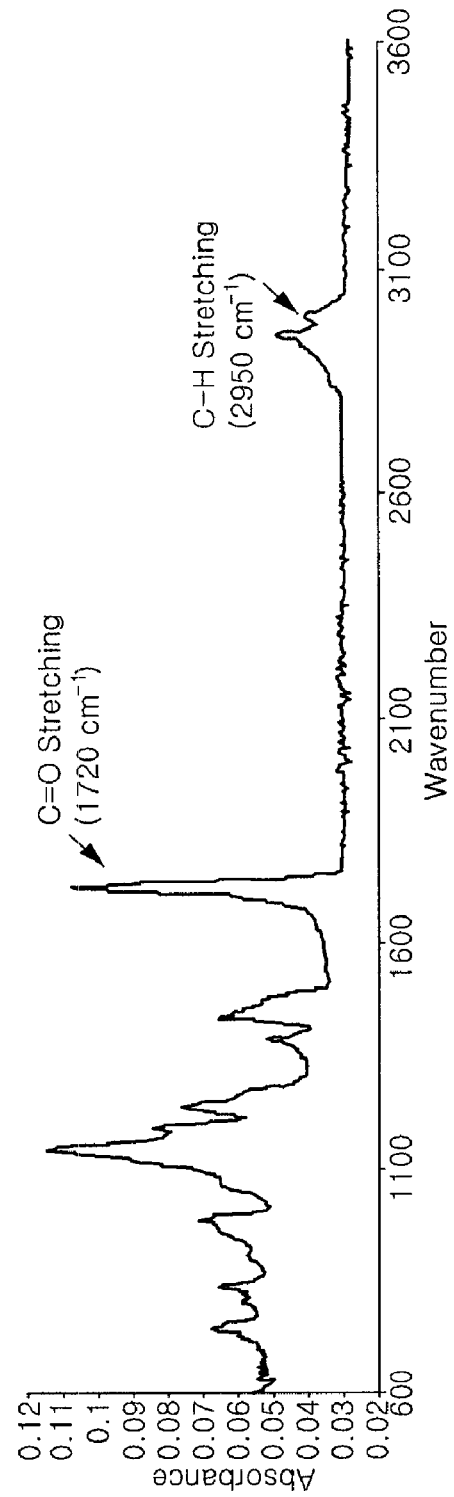

[Fig. 7]
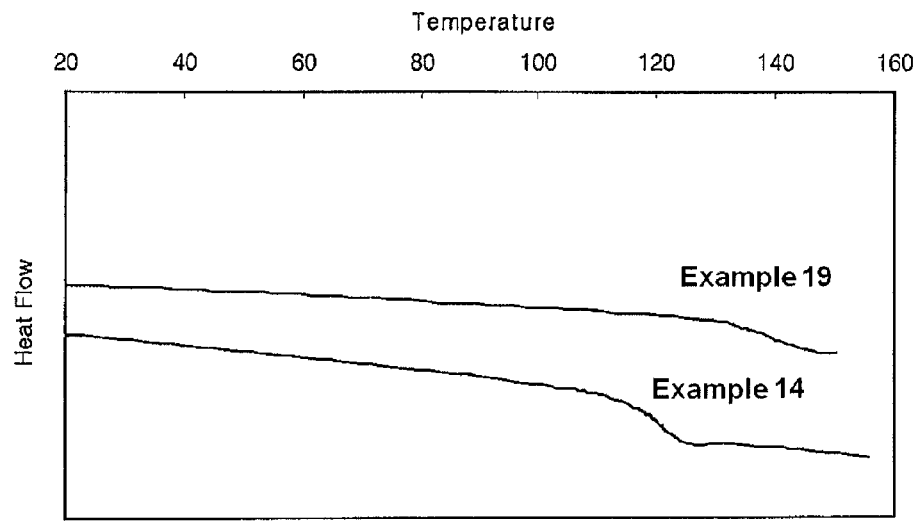
[Fig. 8]
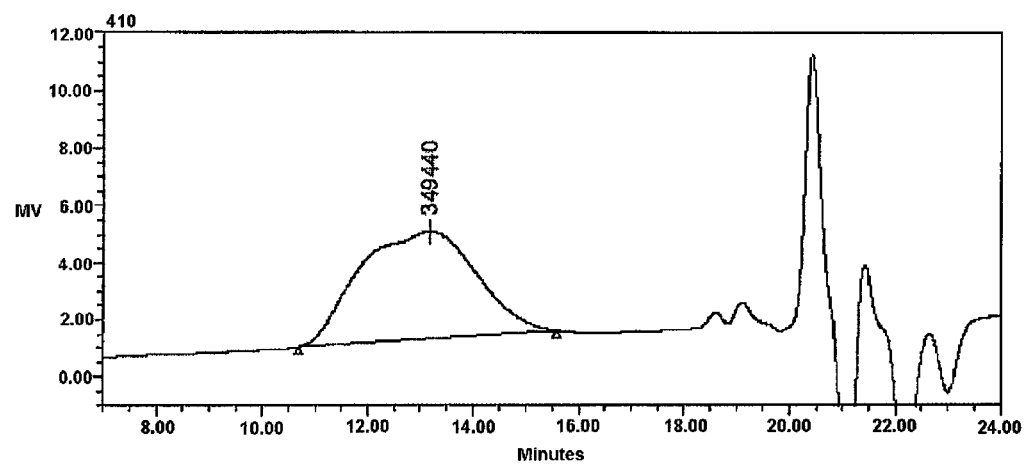

[Fig. 9]
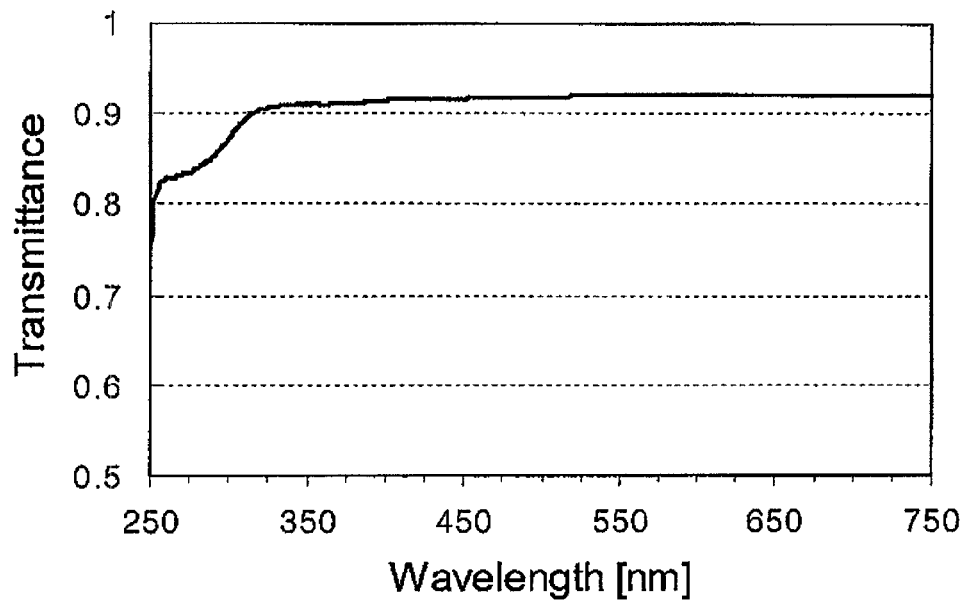
[Fig. 10]
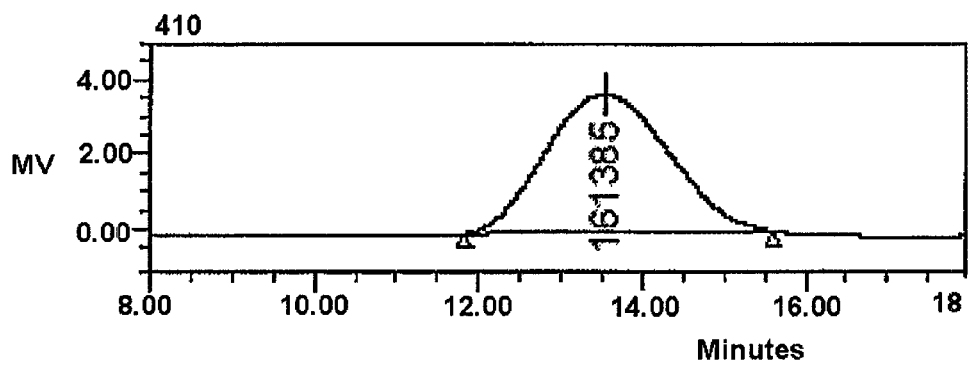

[Fig. 11]
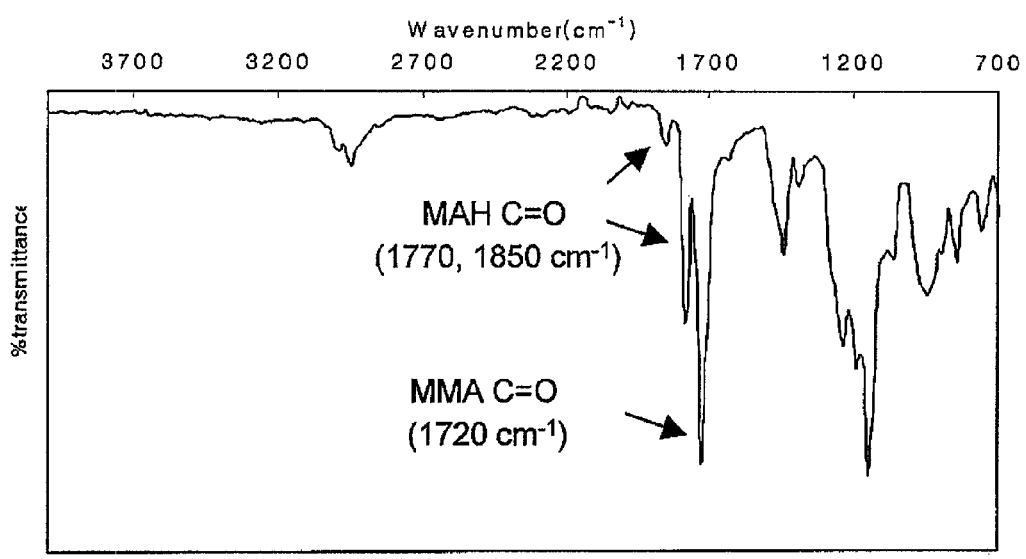
[Fig. 12]
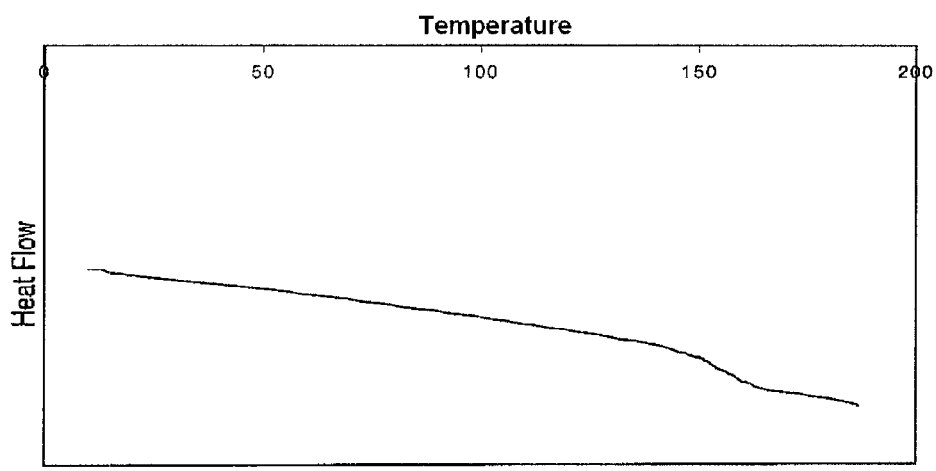

OPTICAL FILM, PROTECTION FILM POLARIZER FILM, POLARIZER PLATE FABRICATED THEREFORM, AND DISPLAY DEVICE EMPLOYING THEROF

This application is a 35 U.S.C. §371 National Stage entry of International Application No. PCT/KR2008/002911 filed May 23, 2008, which claims priority to Korean Application No. 2007-0050754 filed May 25, 2007, and Korean Application No. 2007-0089138 filed Sep. 3, 2007 all of which are hereby incorporated by reference for all purposes as if fully set forth herein in their entireties.

TECHNICAL FIELD

The present invention relates to an optical film, a protective film for a polarizer film, a polarizer plate using the same, and an image display device using the same. This application claims priority from Korean Patent Application Nos. 10-2007-50754 and 10-2007-89138 filed on May 25, 2007 and Sep. 3, 2007 in the KIPO, the disclosure of which is incorporated herein by reference in its entirety.

BACKGROUND ART

In general, a polarizer plate has a structure that contains a polarizer film having a structure in which polyvinyl alcohol (PVA) molecular chains are aligned in a predetermined direction and an iodine compound or a dichromatic polarizing substance is contained, or a structure that has a polyene structure formed by dehydration reaction of the polyvinyl alcohol film or the dehydrochlorination reaction of the polyvinyl chloride (PVC) film; and a triacetyl cellulose film (hereinafter, referred to as TAC film) acting as the protective film that is layered on the polarizer film using an aqueous adhesive made of a polyvinyl alcohol aqueous solution.

Both the polyvinyl alcohol film used as the polarizer and the TAC film used as the protective film for polarizers have poor heat resistance and humidity resistance. Therefore, if the polarizer plate that is made of the films is used at a high temperature or a high humidity atmosphere for a long period of time, the degree of polarization is reduced, the polarizer and the protective film are separated from each other, or optical properties are reduced. Thus, in terms of the purposes, there are various limits. As described above, the polarizer plate that has been commercialized until now has undesirable heat and moisture resistance. In addition, in the case of the TAC film, a change in in-plane retardation (Rin) and thickness retardation (Rth) is significant according to a change in the ambient temperature/humidity atmosphere. In particular, a change in retardation in respects to incident light at an inclined direction is significant. If the polarizer plate that includes the TAC film having the above-mentioned characteristics as the protective film is applied to a liquid crystal display, the viewing angle characteristics are changed according to the change in the ambient temperature/humidity atmosphere, thus reducing the image quality. In addition, in the case of the TAC film, a change in dimension is significant according to the change in the ambient temperature/humidity atmosphere and the photoelastic coefficient is relatively high, thus, after evaluation in respects to durability in a high heat and/or humidity atmosphere, a change in retardation occurs and light is leaked locally, thereby easily reducing the image quality.

As a material to avoid the disadvantages of the TAC film, a (meth)acrylic resin is well known. However, it is known that the (meth)acrylic resin is easily broken or splitted to cause problems in terms of transportability during the production of the polarizer plate and the productivity is poor.

In order to solve this problem, a method of blending an acryl resin with another resin or a toughnening agent (Japanese Unexamined Patent Application Publication Nos. 2006-284881 and 2006-284882) or a method of coextruding other resins to perform the layering (Japanese Unexamined Patent Application Publication Nos 2006-243681, 2006-215463, 2006-215465, and 2007-017555) has been suggested. However, theses methods have problems in that high intrinsic heat resistance and high transparency of the acryl resin are not sufficiently realized or there is a complicated layered structure.

DISCLOSURE

Technical Problem

It is an object of the present invention to provide an optical film that has excellent optical transparency and optical characteristics, improved brittleness, reduced dimensional change and reduced change in optical characteristics according to a change in environment including an ambient temperature and humidity, and excellent durability, a high-quality protective film for a polarizer film using the same, a polarizer plate using the film, and an image display device.

Technical Solution

In order to accomplish the object, the present invention provides an optical film including a copolymer that includes (a) an alkene monomer; (b) an acrylate monomer; and (c) at least one of an unsaturated organic acid monomer and an unsaturated acid anhydride monomer having one or more double bonds. In the copolymer, it is preferable that the amount of the alkene monomer is in the range of 0.1~30 mole %, the amount of the acrylate monomer is in the range of 30~99 mole %, and the amount of at least one of an unsaturated organic acid monomer and an unsaturated acid anhydride monomer is in the range of 0.1~50 mole %.

In addition, the present invention provides a protective film for a polarizer film including a copolymer that includes (a) an alkene monomer; (b) an acrylate monomer; and (c) at least one of an unsaturated organic acid monomer and an unsaturated acid anhydride monomer having one or more double bonds.

In addition, the present invention provides a polarizer plate including a polarizer; and a protective film that is provided on at least one side of the polarizer. The protective film includes a copolymer that includes (a) an alkene monomer; (b) an acrylate monomer; and (c) at least one of an unsaturated organic acid monomer and an unsaturated acid anhydride monomer having one or more double bonds.

In addition, the present invention provides an image display device that includes the polarizer plate.

Advantageous Effects

An optical film according to the present invention has excellent optical transparency and optical characteristics, improved brittleness, reduced dimensional change and reduced change in optical characteristics according to a change in environment including an ambient temperature and humidity, and excellent durability. Accordingly, the optical film can be used for various purposes. In particular, the optical film can be used as a high-quality protective film for a polarizer film. Therefore, it is possible to provide a high-quality polarizer plate and an image display device having excellent durability such as heat and moisture resistance.

DESCRIPTION OF DRAWINGS

FIG. 1 illustrates a hydrogen nuclear magnetic resonance spectrum ($^1$H-NMR spectrum) of an ethylene-methyl methacrylate copolymer that is obtained in Comparative Example 1;

FIG. 2 illustrates IR spectrum of an ethylene-methyl methacrylate-methacrylic acid three-membered copolymer that is obtained in Example 2;

FIG. 3 illustrates the TGA results of an ethylene-methyl methacrylate-methacrylic acid three-membered copolymer that is obtained in Example 3;

FIG. 4 illustrates a differential scanning calorimetry (DSC) analysis result of an ethylene-methyl methacrylate-methacrylic acid three-membered copolymer that is obtained in Example 4;

FIG. 5 illustrates the gel permeation chromatography (GPC) analysis results of an ethylene-methyl methacrylate-methacrylic acid three-membered copolymer that is obtained in Example 4;

FIG. 6 illustrates an IR spectrum of an ethylene-methyl methacrylate copolymer that is obtained in Comparative Example 1;

FIG. 7 illustrates the differential scanning calorimetry (DSC) analysis results of an ethylene-methyl methacrylate-maleic acid anhydride random copolymer that is obtained in Examples 14 and 19;

FIG. 8 illustrates the gel permeation chromatography (GPC) analysis results of an ethylene-methyl methacrylate-maleic acid anhydride random copolymer that is obtained in Example 15;

FIG. 9 illustrates the UV-Visible spectrum analysis results of the film that is produced by using an ethylene-methyl methacrylate-maleic acid anhydride random copolymer that is obtained in Example 18;

FIG. 10 illustrates the gel permeation chromatography (GPC) analysis results of an ethylene-methyl methacrylate-maleic acid anhydride random copolymer that is obtained in Example 19;

FIG. 11 illustrates the IR spectrum analysis results of an ethylene-methyl methacrylate-maleic acid anhydride random copolymer that is obtained in Example 20; and FIG. 12 illustrates the differential scanning calorimetry (DSC) analysis results of an ethylene-methyl methacrylate-maleic acid anhydride-glycidyl methacrylate random copolymer that is obtained in Example 21.

BEST MODE

Hereinafter, the present invention will be described in detail.

An optical film according to the present invention includes a copolymer including (a) an alkene monomer, (b) an acrylate monomer, and (c) at least one of an unsaturated organic acid monomer and an unsaturated acid anhydride monomer having one or more double bonds.

In the present invention, the copolymer is a copolymer that is formed by polymerizing (a) an alkene monomer, (b) an acrylate monomer, and (c) at least one of an unsaturated organic acid monomer and an unsaturated acid anhydride monomer having one or more double bonds. For convenience of the understanding, the terms of the monomers are used to express the structures thereof. It can be easily understood by those who skilled in the art that the double bonds of the monomers are not present at the main chain of the copolymer.

In the present invention, examples of the alkene monomer include, but are not limited to alkenes such as 1-alkene that has a double bond at an end of a carbon chain thereof, 2-alkene and 3-alkene that has a double bond at a middle part of a carbon chain thereof, and the like.

Examples of 1-alkene may include ethylene, propylene, 1-butene, 1-pentene, 1-hexene, 1-hepthene, 1-octene, 1-nonen, 1-decene and the like. Examples of alkene that has the double bond at the middle part of the carbon chain thereof may include 2-butene, 2-pentene, 2-hexene, 3-hexene, 2-hepthene, 2-octene, 2-nonen and the like.

In the copolymer, the content of the alkene monomer is in the range of 0.1 to 30 mole % and preferably 10 to 30 mole %. In the case of when the polymer includes only the monomers having the polar group without the alkene monomer, there is a problem in that the formed film is easily broken. In particular, if the content of the alkene monomer in the copolymer is 10 mole % or more, the polymer is not easily broken when the monomer is applied to the layered film of the optical material.

In the present invention, the acrylate monomer may be a compound having a double bond between conjugated carbons and carbonyl group of an ester group, and a substituent group thereof is not limited. In the present specification, it is to be understood that the term "acrylate monomer" means acrylate and an acrylate derivative, and includes alkyl acrylate, alkyl methacrylate, alkyl butacrylate and the like.

Specifically, examples of the acrylate monomer include a compound that is represented by the following Formula 1.

[Formula 1]

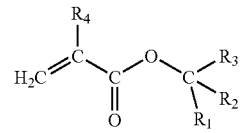

In Formula 1, $R_1$, $R_2$ and $R_3$ are each independently a hydrogen atom or a monovalent hydrocarbon group that is capable of including a hetero atom and has 1 to 30 carbon atoms, at least one of $R_1$, $R_2$ and $R_3$ may be an epoxy group, and $R_4$ is a hydrogen atom or an alkyl group having 1 to 6 carbon atoms.

In Formula 1, examples of the acrylate monomer in which at least one of $R_1$, $R_2$ and $R_3$ is an epoxy group include glycidyl methacrylate and glycidyl acrylate. In addition, examples of the acrylate monomer include alkyl acrylate including a straight- or branched-chained alkyl group having 1 to 12 carbon atoms, alkyl methacrylate including a straight- or branched-chained alkyl group having 1 to 12 carbon atoms, or alkyl butacrylate including a straight- or branched-chained alkyl group having 1 to 12 carbon atoms.

It is preferable that the content of the acrylate monomer in the copolymer be in the range of 30 to 99 mole %, preferably 40 to 95 mole %, more preferably 50 to 90 mole %, and most preferably 50 to 80 mole %.

In the case of when the content of the acrylate comonomer that is the polar monomer is increased, the crystallinity that is the intrinsic physical property of alkene, particularly 1-alkene such as ethylene, can be prevented. Thus, it is possible to produce an amorphous copolymer. It is difficult to manufacture the amorphous 1-alkene-acrylate copolymer by using a known technology. Since the amorphous copolymer has the high transparency and the excellent adhesion property, it is possible to use the amorphous copolymer as an optical material. In particular, since the amorphous copolymer has many polar functional groups, the copolymer has the excellent adhesion strength in respects to metal or the like. Thus, the copolymer is useful to apply electric devices.

In the above reaction, in the case of when the amount of the acrylate comonomer is less than 30 mole % based on the total amount of the monomers, the adhesion property and the transparency are poor. In the case of when the amount of the acrylate comonomer is more than 99 mole %, there is a problem in that the mechanical property of the polymer decreases and the polymer is easily broken. In addition, in order to apply the copolymer to a layered film for optical materials, the amount of the acrylate monomer is preferably 95 mole % or less and more preferably 90 mole % or less so as to reduce the breaking property during the formation of the film.

In the present invention, the unsaturated organic acid or the unsaturated acid anhydride has one or more double bonds and can be used to perform radical polymerization by using the double bond. It is to be understood that even though there is no mention regarding the unsaturated acid anhydride in the specification, the unsaturated acid anhydride has one or more double bonds unless otherwise specified.

It is preferable that the unsaturated organic acid monomer have one or more carboxylic acids. The unsaturated organic acid monomer is more preferably an unsaturated carboxylic acid compound having a double bond between conjugated carbons and the carboxylic group. The substituent groups thereof are not limited. Specific examples of the unsaturated organic acid monomer include, but are not limited to monovalent or polyvalent carboxylic acids such as a monovalent carboxylic acid such as an acrylic acid, a divalent carboxylic acid such as a maleic acid and the like.

In the case of when the unsaturated organic acid monomer is the acrylic acid, the acrylic acid is preferably an acrylic acid compound that is represented by the following Formula 2. However, another acrylic acid derivatives such as an alkyl methacrylic acid may be used.

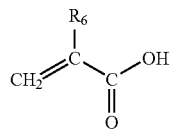

[Formula 2]

In Formula 2,
$R_6$ is a hydrogen atom or an alkyl group having 1 to 6 carbon atoms.

Examples of the divalent carboxylic acid may include a maleic acid, a maleic acid derivative substituted with at least one alkyl group.

Carboxylic acid anhydride may be used as the unsaturated acid anhydride, and monovalent or polyvalent carboxylic acid anhydride may be used. Preferably, maleic anhydride or a derivative thereof may be used, for example, the compound that is represented by the following Formula 3 may be used.

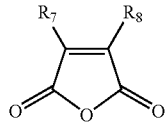

[Formula 3]

In the above Formula, $R_7$ and $R_8$ are each independently a hydrogen atom or an alkyl group having 1 to 6 carbon atoms.

However, the scope of the present invention is not limited to the above examples, maleic anhydrides having different substituent groups or other types of unsaturated acid anhydrides may be used.

In the copolymer, the content of at least one of the unsaturated organic acid monomer and the unsaturated acid anhydride monomer is in the range of 0.1 to 50 mole %, and preferably 10 to 30 mole %. In the case of when the unsaturated organic acid monomer or the unsaturated acid anhydride monomer is introduced as a component of the copolymer, the copolymer has a high glass transition temperature. Thus, the copolymer may be used as the optical material. In particular, since the copolymer has many hydrophilic or polar functional groups, the copolymer has the excellent adhesion strength. Thus, the copolymer is useful to be applied to electric devices.

The copolymer that consists of the repeating units of the above-mentioned monomers may include a repeating unit that is represented by the following Formula 4.

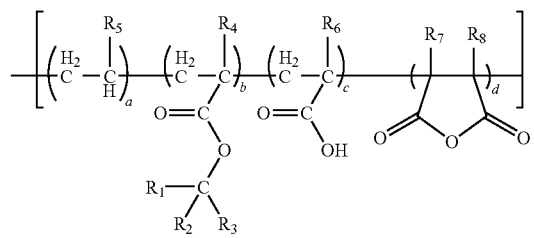

[Formula 4]

In Formula 4,
a, b and c are molar ratios, a, b and c are not 0 all at the same time,
$R_1$ to $R_4$ and $R_6$ to $R_8$ are the same as those of the above, and $R_5$ is a hydrogen atom or an alkyl group having 1 to 6 carbon atoms.

The copolymer may be a random copolymer. In this case, the copolymer according to the present invention may include various types of repeating units that are represented by Formula 4.

The glass transition temperature (Tg) of the copolymer is in the range of 80 to 220° C., preferably 100 to 220° C. and more preferably 120 to 180° C. In order to effectively use the copolymer as an optical material, it is preferable that the glass transition temperature be 100° C. or more. In addition, it is preferable that the copolymer according to the present invention have a number average molecular weight in the range of 5,000 to 400,000 and a weight average molecular weight in the range of 10,000 to 800,000. In addition, it is preferable that the copolymer according to the present invention have a temperature at which an initial weight is reduced by half ($Td_{50}$) in the range of 300 to 550° C.

Since the copolymer has the high content of polar group, there is no crystallinity in alkene such as ethylene. Thus, a polymer film is formed by using the copolymer is transparent. Additionally, since the copolymer includes the unsaturated organic acid or the unsaturated acid anhydride, the copolymer has the high glass transition temperature and the improved adhesion property and preferably used for a polarizer plate and an optical film having a multilayered structure.

In addition, the copolymer that is described in the present specification may include any one or two or more of the above monomers. In particular, two types or more of acrylate monomers may be used and one type or more of them may be preferably an alkyl acrylate monomer. Additionally, the copolymer may include all the unsaturated organic acid and the unsaturated acid anhydride, and one type or two types or more of them may be included. Within the range of the physical properties of the polymer and the object of the present invention, the copolymer may further include a comonomer. Examples of the comonomer may include maleimides, methyl maleimides, ethyl maleimides, butadiene, styrene and the like.

The copolymer may be manufactured by polymerizing the above monomers in the presence of the Lewis acid or the metal oxides by using a radical polymerization initiator.

The metal oxide acts as the Lewis acid that provides an acid site and is included in the Lewis acid in the polymerization reaction. However, in comparison with the typical other Lewis acids, since there are no change in the structure and the composition even after the polymerization-reaction, there are additional advantages in that the separation can be easily performed and the reuse can be performed. Thus, in the present specification, for convenience of the understanding, the metal oxide is called the metal oxide or the complex metal oxide so as to be discriminated from the other typical Lewis acids.

It is preferable that the metal oxide be a compound represented by the following Formula 5.

   [Formula 5]

In Formula 5,

M is one or more selected from the group consisting of alkali earth metal, transition metal, Group 13 metal and Group 14 metal;

N is a Group 5 or 6 atom;

O is an oxygen atom; and x, y and z are values that are determined by an oxidation state of M and N with x>0, y≧0, and z>0.

To be more specific, preferable examples of the metal oxide include one or more selected from the group consisting of metal oxides such as aluminum oxide ($Al_2O_3$), yttrium oxide ($Y_2O_3$), zinc oxide ($ZrO_2$), halfnium oxide ($HfO_2$), silicon oxide ($SiO_2$), boron oxide ($B_2O_3$), cesium oxide ($CeO_2$), dysprosium oxide ($Dy_2O_3$), erbium oxide ($Er_2O_3$), europium oxide ($Eu_2O_3$), gadolinium oxide ($Gd_2O_3$), holmium oxide ($Ho_2O_3$), lanthanum oxide ($La_2O_3$), lutetium oxide ($Lu_2O_3$), neodymium oxide ($Nd_2O_3$), praseodymium oxide ($Pr_6O_{11}$), samarium oxide ($Sm_2O_3$), terbium oxide ($Tb_2O_3$), thorium oxide ($Th_4O_7$), thulium oxide ($Tm_2O_3$), ytterbium oxide ($Yb_2O_3$), tin oxide (SnO), and titanium oxide ($TiO_2$), and complex metal oxides such as dysprosium aluminate ($Dy_3Al_5O_{12}$), yttrium aluminate ($Y_3Al_5O_{12}$), aluminum titanate ($Al_2O_3.TiO_2$), aluminum silicate ($3Al_2O_3.2SiO_2$), calcium titanate ($CaTiO_3$), calcium zirconate ($CaZrO_3$), iron titanate ($FeTiO_3$), magnesium aluminate ($MgO.Al_2O_3$), cesium aluminate ($CeAl_{11}O_{18}$), $Al_2(SO_4)_3$, and $AlPO_4$.

Since the metal oxide can be completely recovered by using a physical method using only a filtering apparatus, and the recovered metal oxide can be used to perform the polymerization, the manufacturing cost can be significantly reduced and the copolymer having the high purity can be provided. The recovered metal oxide may be reused 20 times.

Preferable examples of the Lewis acid include a Lewis acid that includes one or more metal cations selected from the group consisting of scandium, titanium, vanadium, chrome, manganese, iron, cobalt, copper, zinc, boron, aluminum, yttrium, zirconium, niobium, molybdenum, cadmium, rhenium and tin, and one or more metal anions selected from the group consisting of halides, triflates, $HPO_3^{2-}$, $H_3PO^{2-}$, $CF_3COO^-$, $C_7H_{15}OSO^{2-}$ and $SO_4^{2-}$. To be more specific, preferable examples of the Lewis acid include aluminum trichloride, scandium triflate, zinc triflate, copper triflate, trifluoro boron, and a mixture thereof.

In the method of manufacturing the copolymer, it is preferable that the metal oxide or the Lewis acid be used in an amount of 0.01 to 200 mole % based on the acrylate comonomer.

Since the metal oxide or the Lewis acid is used, the content of the monomers included as the repeating unit in the manufactured copolymer can be appropriately controlled and adjusted according to the required physical properties. In particular, in the case of when the alkene monomers such as ethylene or propylene that are present in a gas phase under the reaction condition are partially dissolved in a solvent to perform the polymerization reaction, the metal oxide or the Lewis acid can control the amount of the alkene monomer required to ensure the desirable physical properties of the copolymer to be manufactured, and allow the polymerization reaction to be performed at low temperature under low pressure as compared to a known technology. In particular, since all the metal oxide is easily 100% recovered by only using a filter after the polymerization and then recycled, the production cost thereof can be significantly reduced and water and air stabilities are excellent. Thus, high efficiency can be ensured and the polymerization process can be simplified.

Preferable examples of the radical polymerization initiator include peroxides, azo compounds and the like. To be more specific, examples of the peroxide compound may include hydrogen peroxide, decanonyl peroxide, t-butyl peroxyneodecanoate, t-butyl peroxypivalate, 3,5,5-trimethylhexanoyl peroxide, diethyl peroxide, t-butylperoxy-2-ethyl hexanoate, t-butylperoxy isobutylate, benzoyl peroxide, t-butylperoxy acetate, t-butylperoxy benzoate, di-t-butyl peroxide, t-amylperoxy neodecanoate, t-amylperoxy pivalate, t-amylperoxy-2-ethyl hexanoate, 1,1,3,3-tetramethylbutyl hydroperoxide, alkali metal persulfate, perborate and percarbonate, and examples of the azo compound may include 2,2'-azo-bis (isobutyronitrile) (AIBN). The preferable initiator is the azo compound. A mixture of the initiators may be used.

The radical polymerization initiator may be added to the reaction stream in an appropriate form, for example, in a pure form, in a form in which the initiator is dissolved in the appropriate solvent, and/or in a mixture form of the monomer or comonomer feed stream and the initiator. It is preferable that the radical polymerization initiator used to manufacture the copolymer be added in an amount of 0.01 to 10 mole % based on the acrylate monomer. However, the amount of the radical polymerization initiator is not limited but may vary if necessary.

It is preferable that the polymerization reaction of the copolymer be performed in the presence of a solvent, in particular, an organic solvent. Preferable examples of the solvent include one or more solvents that are selected from the group consisting of toluene, chlorobenzene, n-hexane, heptane, tetrahydrofuran, ether, methanol, ethanol, chloroform, and methylene chloride, but are not limited thereto. That is, the type of solvent is not limited as long as the solvent is capable of being used in the art to which the present invention belongs.

In the polymerization reaction, since the acrylate monomer and the unsaturated organic acid or the unsaturated acid anhydride monomer are generally present in a liquid phase under the reaction condition, the acrylate monomer and the unsaturated acid anhydride monomer are dissolved in the solvent to be used in the polymerization reaction. Accordingly, as long as the monomers that are included in the above-mentioned copolymer are present in a liquid phase under the reaction condition, the reaction pressure is not limited.

Meanwhile, in the case of when the alkene monomer is particularly ethylene and propylene, since the alkene monomer is generally present in a gas phase under the reaction condition, in order to include the alkene monomer in the repeating unit of the copolymer according to the present invention in a predetermined amount, the high pressure reaction condition is required. However, in the case of when the alkene monomer is present in a liquid phase under the reaction condition, the reaction pressure is not limited.

Unlike a known technology that requires the severe reaction condition of the high temperature of 100° C. or more and the high pressure of 1000 atm or more, the polymerization reaction may be performed under the mild condition of 200 atm or less and 150° C. or less, and preferably 50 atm or less and 100° C. or less. Thus, the polymerization reaction is a simple process and it is easy to control the physical properties of the manufactured copolymer.

Specifically, in respects to the reaction condition for polymerization of the copolymer, in the case of when the alkene monomer is present in a gas phase under the reaction condition, it is preferable that the polymerization reaction be performed under pressure in the range of 5 to 200 atm and the temperature condition in the range of 30 to 150° C. In particular, the reaction is performed under pressure in the range of 20 to 50 atm and the temperature condition in the range of 50 to 80° C.

When the polymerization pressure is less than 5 atm, the content of the alkene monomer decreases. When the polymerization pressure is more than 200 atm, additional instruments are required. In addition, when the polymerization temperature is less than 30° C., initiators may not be activated. When the polymerization temperature is more than 150° C., it may be difficult to control the polymerization process.

According to an embodiment of the present invention, ethylene or propylene is used as the alkene monomer, methyl methacrylate or methyl acrylate is used as the acrylate monomer, the methacrylic acid or acrylic acid as the unsaturated organic acid and/or the maleic anhydride as the unsaturated acid anhydride monomer is used, aluminum oxide is used as the metal oxide, and the polymerization is performed by using AIBN as the polymerization initiator under pressure in the range of 5 to 50 atm and the temperature in the range of 50 to 80° C.

Among the copolymers according to the present invention, the alkene-acrylate-acrylic acid three-membered copolymer may be manufactured by partially hydrolyzing the alkene-acrylate two-membered copolymer. The partial hydrolyzing may be performed under the reaction condition for typical hydrolysis by appropriately selecting the type of acid or base catalyst and the type of reaction media for hydrolysis. In this case, in the alkene-acrylate two-membered copolymer that is used as the raw material, the content of acrylate must be the total content of acrylate and the acrylic acid of the manufactured three-membered copolymer, and the hydrolysis condition must be controlled so that the content ratio of the monomers required in the final three-membered copolymer is obtained.

In addition, after the polymer of the alkene-acrylate-unsaturated acid anhydride according to the present invention is manufactured, the acid anhydride may be converted into the organic acid through the hydrolysis reaction in the presence of acid to manufacture the alkene-acrylate-acrylic acid three-membered copolymer among the copolymers according to the present invention. The degree of hydrolysis reaction may be controlled to manufacture a 4-membered random copolymer of the alkene monomer-acrylate monomer-organic acid monomer-acid anhydride.

The hydrolysis condition may include the type of acid or base catalyst, the type of reaction media, the reaction temperature, the reaction pressure, the reaction time or the like for hydrolysis, and may be appropriately selected by those who skilled in the art through an experiment method in consideration of the desirable degree of hydrolysis.

The copolymer prepared as the above has high glass transition temperature and toughness and excellent light transmissivity and adhesion property.

The method of producing the optical film according to the present invention by using the above copolymer is not limited, but a melt extrusion method, a calendar film forming method, and a solution cast film forming method may be used. The melt extrusion method is a method in which a copolymer is heated and molten in a cylinder, pressed by a screw, and extruded from a die such as a T-die to the outside. If the melt extrusion temperature is described, it is preferable that the internal temperature of the extruder be 230° C., 240° C., 240° C., and 245° C. from the injection port of the extruder and the temperature of the die be 250° C. The solution cast film forming method is a method in which a copolymer resin solution is produced by using an organic solvent, a film is formed, the solvent is dried, and the winding is performed.

In order to manufacture the optical film, a general additive, for example, a plasticizer, a lubricant, an impact modifier, a stabilizing agent, a ultraviolet ray absorption agent and the like, may be added to the copolymer resin. In particular, in the case of when the optical film according to the present invention is used as a protective film of a polarizer, in order to protect the polarizer and the liquid crystal panel from the external ultraviolet rays, the ultraviolet ray absorbing agent may be added to the copolymer resin. Preferable examples of ultraviolet ray absorbing agent may include, but are not limited to a benzotriazole ultraviolet ray absorbing agent and a triazine ultraviolet ray absorbing agent. Preferably, Tinuvin P, and Tinuvin 360 may be used. Iganox 259, and Iganox 1010 may be added as a thermal stabilizing agent.

Since the above optical film that includes the copolymer is produced by using a copolymer resin that has high light transmissivity, glass transition temperature and toughness, high optical transparency is obtained and an adhesion property is excellent because the content of the monomer having the polar functional group is high. Accordingly, the optical film can be used as a layered film such as a polarizer plate. In addition, the optical film according to the present invention has the excellent optical characteristics and reduced dimensional change and reduced change in optical characteristics according to an ambient temperature and humidity. Accordingly, it can be used as various optical films.

In addition, the present invention provides a protective film for a polarizer film that includes a copolymer including (a) an alkene monomer, (b) an acrylate monomer, and (c) at least one of an unsaturated organic acid monomer and an unsaturated acid anhydride monomer having one or more double bonds.

It is preferable that the thickness of the protective film for the polarizer film according to the present invention be in the range of 20 to 200 µm.

In the protective film for the polarizer film according to the present invention, the surface of the protective film may be modified in order to improve the adhesion strength. Examples of the modifying method include a method of treating a surface of the protective film by using corona treatment, plasma treatment, and UV treatment, and a method of forming a primer layer on the surface of the protective film. Both the methods may be used simultaneously. The type of the primer is not limited, but it is preferable to use the compound having the reactive functional group such as a silane coupling agent.

In addition, the present invention provides a polarizer plate that includes a polarizer and a protective film provided on at least one side of the polarizer. The protective film includes a copolymer including (a) an alkene monomer, (b) an acrylate monomer, and (c) at least one of an unsaturated organic acid monomer and an unsaturated acid anhydride monomer having one or more double bonds.

In the present invention, any polarizer may be used as long as the polarizer is known in the art, and for example, a film which contains iodine or dichromatic dyes and is made of polyvinyl alcohol (PVA) may be used. The polarizer may be produced by applying iodine or dichromatic dyes on the PVA film. However, the production method of the polarizer plate is not limited. In the specification, the polarizer does not include the protective film, and the polarizer plate includes the polarizer and the protective film.

The adhesion of the polarizer and the protective film may be performed by using an adhesive layer. Examples of the adhesive which is capable of being used to combine the protective film and the polarizer are not limited as long as the adhesive is known in the art. Examples of the adhesive include, but are not limited to a one- or two-liquid type polyvinyl alcohol (PVA) adhesive, a polyurethane adhesive, an epoxy adhesive, a styrene-butadiene rubber (SBR) adhesive, a hot melt adhesive and the like.

Among the adhesives, it is preferable to use a polyvinyl alcohol adhesive. In particular, it is preferable to use the adhesive that includes the polyvinyl alcohol resin having the acetoacetyl group and the amine metal compound crosslinking agent. The adhesive for the polarizer plate may include 100 parts by weight of the polyvinyl alcohol resin having the acetoacetyl group and the 1 to 50 parts by weight of the amine metal compound crosslinking agent.

The polyvinyl alcohol resin is not limited as long as the resin is capable of desirably attaching the polarizer and the protective film to each other, and has excellent optical penetration and no consecutive change such as yellowing. In consideration of the desirable crosslinking reaction to the crosslinking agent, it is preferable to use the polyvinyl alcohol resin containing the acetoacetyl group.

The degree of polymerization and saponification of the polyvinyl alcohol resin are not limited as long as the polyvinyl alcohol resin contains the acetoacetyl group, but it is preferable that the degree of polymerization be 200 to 4,000 and the degree of saponification be 70 to 99.9 mol %. In consideration of the desirable mixing to the contained material according to the free movement of molecules, it is more preferable that the degree of polymerization is 1,500 to 2,500 and the degree of saponification is 90 to 99.9 mol %. In connection with this, it is preferable that the polyvinyl alcohol resin contain 0.1 to 30 mol % of acetoacetyl group. In the above-mentioned range, the reaction to the crosslinking agent may be desirably performed and the adhesive may have the desired waterproofing property and adhesion strength.

The amine metal compound crosslinking agent is a water-soluble crosslinking agent that contains a functional group having reactivity to the polyvinyl alcohol resin, and preferably, a metal complex containing an amine ligand. Examples of metal that is capable of being applied to the metal complex include a transition metal such as zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), and platinum (Pt). Examples of the ligand that is coupled with the central metal may include any ligand as long as the ligand contains at least one amine group such as primary amines, secondary amines (diamines), tertiary amines, or ammonium hydroxides. It is preferable that the amount of the crosslinking agent be 1 to 50 parts by weight based on 100 parts by weight of polyvinyl alcohol resin. In the above-mentioned range, it is possible to provide significant adhesion strength to the target adhesive and to improve the storage stability (pot life) of the adhesive.

The aqueous solution including the polyvinyl alcohol resin containing the acetoacetyl group and the amine metal compound crosslinking agent as used as the adhesive may have the pH of 9 or less.

It is preferable that the pH of the adhesive aqueous solution including the polyvinyl alcohol resin containing the acetoacetyl group and the amine metal compound crosslinking agent be controlled to 9 or less using a pH controlling agent. More preferably, the pH may be controlled to more than 2 and 9 or less, and even more preferably, 4 to 8.5.

The combination of the polarizer and the protective film may be performed according to an attachment method using an adhesive. That is, the adhesive is applied on the surface of the protective film of the polarizer or the PVA film that is the polarizer by using a roll coater, a gravure coater, a bar coater, a knife coater, a capillary coater, or the like. Before the adhesive is completely dried, the protective film and the polarizing film are combined with each other using heat pressing or pressing at normal temperature by means of a combination roll. When a hot melt type adhesive is used, the heat pressing roll is used.

If the polyurethane adhesive is to be used, it is preferable to use the polyurethane adhesive produced by using an aliphatic isocyanate compound which does not cause yellowing due to light. If an one- or two-liquid type dry laminate adhesive or an adhesive having relatively low reactivity in respects to isocyanate and a hydroxy group is used, a solution type adhesive which is diluted with an acetate solvent, a ketone solvent, an ether solvent, or an aromatic solvent may be used. In this connection, it is preferable that the adhesive have low viscosity of 5000 cps or less. Preferably, the adhesive has excellent storage stability and light transmittance of 90% or more at a wavelength of 400 to 800 nm.

If showing sufficient tackifying power, a tackifier may be used for the lamination of the protective film and the polarizing film. If used, a tackifier is preferably heat- or UV-cure sufficiently to show resulting mechanical strength as high as that obtained with an adhesive. Also, the interface adhesion of the tackifier useful in the present invention is large enough so that delamination is possible only when one of the films bonded to each other there through is destroyed.

Specific examples of the tackifier may include natural rubber, synthetic rubber, or elastomer, a vinyl chloride/vinyl acetate copolymer, polyvinyl alkyl ether, polyacrylate, modified polyolefin adhesive having excellent optical transparency, and a curable tackifier containing a curing agent such as isocyanate.

The manufactured polarizer plate may be used for the various purposes. Specifically, the polarizer plate may be preferably applied to an image display device such as a polarizer plate for liquid crystal displays (LCD) and a polarizer plate for preventing the reflection of the organic EL display device. In addition, the optical film according to the present invention may be applied to a complex polarizer plate in which various optical layers such as various types of functional layers, for example, a retardation plate such as a $\lambda/4$ plate and a $\lambda/2$ plate, an optical diffusion plate, a viewing angle enlargement plate, a luminance improvement plate, and a reflection plate are combined with each other.

The polarizer plate according to the present invention may include pressure sensitive adhesive (PSA) layer on at least one side thereof so as to be easily applied to image display devices and the like. In addition, the polarizer plate may further include a release film on the PSA layer in order to protect the PSA layer until the polarizer plate is applied to an image display device.

In addition, the present invention provides an image display that includes the polarizer plate.

For example, the present invention provides a liquid crystal cell wherein it includes a light source, a first polarizer plate, a liquid crystal cell, and a second polarizer plate sequentially layered, and at least one of the first polarizer plate and the second polarizer plate is a polarizer plate that includes a polarizer and a protective film provided on at least one side of the polarizer, in which the protective film includes a copolymer including (a) an alkene monomer, (b) an acrylate monomer, and (c) at least one of an unsaturated organic acid monomer and an unsaturated acid anhydride monomer having one or more double bonds.

The liquid crystal cell includes a liquid crystal layer; a substrate that is capable of supporting the liquid crystal layer; and an electrode layer to apply voltage to the liquid crystal. At this time, the polarizer plate according to the present invention may be applied to a liquid crystal mode such as an In-Plane Switching mode (IPS mode), a Vertically Aligned mode (VA mode), an OCB mode (Optically Compensated Birefringence mode), a Twisted Nematic mode (TN mode), and a Fringe Field Switching mode (FFS mode).

In an image display device according to the present invention, the protective film for the polarizer film according to the present invention may be provided as an internal protective film in a side of the liquid crystal cell of the polarizer plate and/or as an external protective film in an opposite side of the liquid crystal cell of the polarizer plate.

MODE FOR INVENTION

A better understanding of the present invention may be obtained in light of the following Examples which are set forth to illustrate, but are not to be construed to limit the present invention.

The organic agent and the solvent that were required for the polymerization were purified by using the standard method with a product of Aldrich, Co., Ltd. After highly pure ethylene that was manufactured by Applied Gas Technology, Co., Ltd. was passed through by using a water and oxygen filtering apparatus, the polymerization was performed.

In order to obtain the content of the monomer in the copolymer, the spectrum was obtained by using the 500 MHz NMR manufactured by Varian, Co., Ltd. The glass transition temperature (Tg) that was the thermal property of the obtained polymer was measured by using DSC Q100 manufactured by TA Instrument, Corp., and $Td\_50$ (50% thermal decomposition temperature) was measured by using TGA manufactured by TA Instrument, Corp.

Light transmittance of films was measured by UV spectrometer.

The molecular weight and the molecular weight distribution were obtained by using the analysis of the GPC (gel permeation chromatography) manufactured by Waters, Co., Ltd. The analysis temperature was 25° C., tetrahydrofuran (THF) was used as the solvent, and the standardization was performed by using polystyrene to obtain the number average molecular weight (Mn) and the weight average molecular weight (Mw).

Comparative Example 1

After the high pressure reaction apparatus having the volume of 125 mL was vacuumed, argon was charged therein. 28 mmol of methyl methacrylate and 28 mmol of alumina were added to the reactor under the argon atmosphere. In addition, 0.084 mmol of AIBN that was the initiator dissolved in toluene was added thereto. Subsequently, ethylene was charged under 35 bar, the temperature of the reactor was increased to 75° C. and the polymerization was performed for 18 hours.

Comparative Example 2

The polymerization was performed by using the same method as Comparative Example 1, except that the addition amount of alumina was reduced.

Comparative Example 3

The maleic anhydride (MAH) and methyl methacrylate (MMA) were added to the reactor having the volume of 125 mL. In addition, the initiator AIBN that was dissolved in toluene was added thereto. Subsequently, the temperature of the reactor was increased to 65° C. and the polymerization was performed for 18 hours.

The polymerization conditions and the results of Comparative Examples 1 to 3 are described in Tables 1 and 2. In addition, FIG. 1 illustrates a hydrogen nuclear magnetic resonance spectrum ($^1$H-NMR spectrum) of an ethylene-methyl methacrylate random copolymer that is obtained in Comparative Example 1, and the IR spectrum that is the polymerization analysis result of Comparative Example 1 is shown in FIG. 6.

TABLE 1

| | Reaction addition amount | | | | | Polymerization condition | |
|---|---|---|---|---|---|---|---|
| | [Toluene]/[MMA] | [Lewis acid]/[MMA] | [Initiator]/[MMA] | [MAH]/[MMA] | Ethylene | | |
| | (volume ratio) | (molar ratio) | (molar ratio) | (molar ratio) | pressure (bar) | Temperature (° C.) | Time (h) |
| Comparative Example 1 | 9 | 1 | 0.003 | 0 | 35 | 75 | 18 |
| Comparative Example 2 | 9 | 0.2 | 0.003 | 0 | 35 | 75 | 18 |
| Comparative Example 3 | 6 | 0 | 0.002 | 1 | 0 | 65 | 18 |

TABLE 2

| | Composition of polymer | | | Physical properties of polymer | | | |
|---|---|---|---|---|---|---|---|
| | MAH content | MMA content | Ethylene content | | | | |
| | (mol %) | (mol %) | (mol %) | Tg (° C.) | Mw | PDI | $Td_{50}$ (° C.) |
| Comparative Example 1 | 0 | 86 | 14 | 92 | 49000 | 1.64 | 433 |
| Comparative Example 2 | 0 | 90.3 | 9.7 | 111.2 | 71700 | 1.42 | 427 |
| Comparative Example 3 | 41 | 59 | 0 | 142.4 | 251000 | 2.9 | 370.6 |

Comparative Examples 1 and 2 relate to an ethylene-methyl methacrylate random copolymer. As the test results of Comparative Example 1, the ethylene-methyl methacrylate random copolymer having the ethylene content of 14 mole % was polymerized. Comparative Example 2 relates to the result regarding the free radical polymerization while the addition amount of alumina was reduced as compared to the polymerization condition of Comparative Example 1, and the ethylene-methyl methacrylate random copolymer having the ethylene content of 9.7 mole % which was lower as compared to Comparative Example 1 was polymerized. In Comparative Example 2, since the content of ethylene was reduced, the glass transition temperature was increased as compared to that of Comparative Example 1. However, there was a disadvantage in that since the content of ethylene was low, the film was easily broken during the production of the film.

From the results, it can be seen that the addition of alumina increases the content of ethylene in the copolymer, and if the content of ethylene is increased, the glass transition temperature is reduced. In the two polymers, since the content of ethylene was 10 mole % or more, it is possible to manufacture the optical film having the high transparency and the excellent shapability. However, since the glass transition temperature was 100° C. or less, there is a disadvantage in that the heat resistance is undesirable to apply the polymer to an optical film. That is, when the content of ethylene is increased, the property of acrylate regarding easy breaking can be compensated to contribute to the formation of the film, but the applicability thereof is limited due to the low glass transition temperature.

Comparative Example 3 relates to the production of a random copolymer of maleic anhydride (MAH) and methyl methacrylate (MMA), and since the copolymer has the high glass transition temperature, the copolymer has high heat resistance. However, since the copolymer is brittle, it is difficult to form a film by using the copolymer.

1-alkene-acrylate-acrylic acid copolymer

EXAMPLE 1

After the high pressure reaction apparatus having the volume of 125 mL of Parr was vacuumed, argon was charged therein. 28 mmol of methyl methacrylate (MMA), 5.6 mmol of the methacrylic acid (MAA), and 28 mmol of alumina as the Lewis acid were added to the reactor under the argon atmosphere. In addition, 0.056 mmol of AIBN that was the initiator dissolved in toluene was added thereto. Subsequently, ethylene was charged under 35 bar, the temperature of the reactor was increased to 65° C. and the polymerization was performed for 18 hours.

After the polymerization was finished, alumina was removed from the polymerization solution by using the filter, and the polymerization solution was precipitated in ethylene or hexane. The obtained polymer was dried at the temperature of Tg or less under reduced pressure for 24 hours.

EXAMPLE 2

The polymerization was performed by using the same method as Example 1, except that the amount of solvent and the addition amount of MAA were controlled. The IR results of the obtained copolymer are shown in FIG. 2.

EXAMPLE 3

The polymerization was performed by using the same method as Example 1, except that the addition amount of MAA was controlled. The TGA results of the obtained copolymer are shown in FIG. 3.

EXAMPLE 4

The polymerization was performed by using the same method as Example 1, except that alumina was not added and the addition amount of MAA was controlled. The differential scanning calorimetry (DSC) graph and the gel permeation chromatography (GPC) analysis results of the obtained copolymer are shown in FIGS. 4 and 5.

In Examples 1 to 4, the ethylene-MMA-MAA three-membered copolymer that had the glass transition temperature of 140° C. or more was synthesized. The low glass transition temperature problem that was the disadvantage of the copolymer synthesized in Comparative Example was solved, and the 50% thermal decomposition temperature that was measured by using TGA was high of 450° C. or more. Since the glass transition temperature was reduced as the content of ethylene was increased and the glass transition temperature was increased as the content of acrylic acid was increased, the polymer having desirable heat resistance and physical properties could be synthesized according to the change of the polymerization condition.

EXAMPLE 5

The addition amount of MAA was reduced to 0.1 molar ratio as compared to that of MMA, and the amount of toluene that was the reaction solvent was increased. The polymerization temperature was 70° C., the concentration of the initiator was reduced 0.001 molar ratio as compared to that of monomer, and the reaction was performed for 6 hours. Alumina was used as the Lewis acid.

When the results of Example 5 and Examples 1 to 4 were compared to each other, since the content of ethylene was high, the brittleness was improved during the manufacturing of the film. Thus, the polymer was more preferable as the optical film. As compared to Comparative Example 1, even though the content of ethylene was higher, Tg was high. The reason was that the three-membered copolymer including MAA was used. Since Tg was 121° C., the heat resistance that was capable of being used to process LCD films was ensured.

EXAMPLE 6

The polymerization was performed by using the same method as Example 5, except that titanium oxide ($Ti_2O_3$) was used instead of alumina as the Lewis acid and the addition amount of the solvent was reduced.

The results of Example 6 in which titanium oxide ($Ti_2O_3$) was used were similar those of the case of when alumina was used, and various types of metal oxides were used as the Lewis acid.

EXAMPLE 7

The polymerization was performed by using the same method as Example 6, except that the maleic acid that was the divalent acid was used instead of MAA that was the monovalent acid as the acrylic acid and the addition amount of the solvent was reduced.

Like the results of Example 7, the divalent acid was capable of being applied, and the desired polymer having the desirable physical properties was capable of being manufactured by controlling the addition amount.

EXAMPLE 8

The polymerization was performed by using the same method as Example 7, except that maleic anhydride was used instead of the maleic acid. The obtained ethylene-methyl methacrylate-maleic anhydride three-membered random copolymer was dissolved in tetrahydrofuran, then added to the hydrogen chloride aqueous solution, and agitated at 50° C. for 24 hours to perform the reaction.

In Example 8, it was confirmed by using the IR that maleic anhydride was converted into the maleic acid that was the divalent acid by using the hydrolysis reaction in the presence of the acid. After the copolymerization was performed by using maleic anhydride, it was confirmed that the three-membered copolymer polymerization that was similar to that of Example 7 was performed by using the post reaction. The degree of hydrolysis reaction was controlled to obtain the ethylene-methyl methacrylate-maleic anhydride-maleic acid 4-membered random copolymer.

EXAMPLE 9

The ethylene-methyl methacrylate copolymer that was obtained in Comparative Example 1 was subjected to the hydrolysis reaction like Example 8. A portion of the methyl methacrylate was converted into the methacrylic acid by using the hydrolysis reaction in the presence of the acid, and it was confirmed by using the IR that the hydroxyl group of the acid was formed.

As the results of Example 9, while the ethylene-methyl methacrylate-methacrylic acid three-membered copolymer was obtained, Tg and the thermal deformation temperature (Id) were increased and there was no change in the molecular weight. As described above, the three-membered copolymer can be synthesized by using the hydrolysis reaction.

The polymerization condition and the results of Examples 1 to 9 are described in Tables 3 and 4. On the other hand, the IR spectrum that was the polymerization analysis result of Example 2 is shown in FIG. 2, the TGA spectrum that was the polymerization analysis result of Example 3 is shown in FIG. 3, the DSC spectrum that was the polymerization analysis result of Example 4 is shown in FIG. 4, and the GPC spectrum that was the polymerization analysis result of Example 4 is shown in FIG. 5.

TABLE 3

| | Reaction addition amount | Lewis acid | | Monomer addition amount | | | | Initiator | Polymerization condition | |
|---|---|---|---|---|---|---|---|---|---|---|
| | [solvent]/ [monomer] | [alumina]/ [MMA] | [titanium oxide]/[MMA] | [MAA]/ [MMA] | [maleic acid]/[MMA] | [maleic anhydride]/[MMA] | Ethylene | [AIBN]/ [monomer] | | |
| | (volume ratio) | (molar ratio) | (molar ratio) | (molar ratio) | (molar ratio) | (molar ratio) | pressure (bar) | (molar ratio) | Temperature (° C.) | Time (h) |
| Ex. 1 | 9 | 1 | — | 0.2 | — | — | 35 | 0.002 | 65 | 18 |
| Ex. 2 | 6 | 1 | — | 0.25 | — | — | 35 | 0.002 | 65 | 18 |
| Ex. 3 | 9 | 1 | — | 1 | — | — | 35 | 0.002 | 65 | 18 |
| Ex. 4 | 9 | — | — | 0.25 | — | — | 35 | 0.002 | 65 | 18 |
| Ex. 5 | 15 | 1 | — | 0.1 | — | — | 35 | 0.001 | 70 | 6 |
| Ex. 6 | 10 | — | 1 | 0.1 | — | — | 35 | 0.001 | 70 | 6 |
| Ex. 7 | 10 | 1 | — | — | 0.1 | — | 35 | 0.001 | 75 | 6 |
| Ex. 8 | 6 | 1 | — | — | — | 0.25 | 35 | 0.002 | 65 | 18 |
| Ex. 9 | 9 | 1 | — | — | — | — | 35 | 0.003 | 75 | 18 |

In Table 3, [monomer] means a volume or a mole number of MMA+MAA.

TABLE 4

| | Polymer composition ratio (mole %) | | | | Physical properties | | | | | |
|---|---|---|---|---|---|---|---|---|---|---|
| | MMA | Ethylene | MAA | Maleic acid | Tg (° C.) | Mn | Mw | PDI | Td_50 (° C.) | Transparency (%) |
| Ex. 1 | 63 | 11 | 26 | — | 155 | 78600 | 195000 | 2.48 | 461 | 90 |
| Ex. 2 | 55 | 13 | 32 | — | 146 | 61600 | 251000 | 4.08 | 456.5 | 90 |
| Ex. 3 | 35 | 7 | 58 | — | 181 | 88400 | 192000 | 2.17 | 457 | 89 |
| Ex. 4 | 57 | 2 | 35 | — | 156 | 59700 | 123000 | 2.05 | 461.9 | 90 |
| Ex. 5 | 64 | 23 | 13 | — | 121 | 97000 | 207000 | 2.14 | 451 | 89 |
| Ex. 6 | 72 | 17 | 11 | — | 128 | 81200 | 140000 | 1.72 | 442 | 91 |
| Ex. 7 | 67 | 15 | — | 18 | 118 | 59100 | 91500 | 1.55 | 448 | 89 |
| Ex. 8 | 65 | 8 | — | 27 | 123 | 96500 | 172000 | 1.78 | 400.7 | 90 |
| Ex. 9 | 65 | 14 | 21 | — | 151 | 26200 | 45300 | 1.73 | 452 | 89 |

EXAMPLES 10 TO 13

28 mmol of methyl methacrylate (MMA), 5.6 mmol of the methacrylic acid (MAA), and 28 mmol of alumina as the Lewis acid were added to the reactor. In addition, 0.056 mmol of AIBN that was the initiator dissolved in toluene was added thereto. Subsequently, 1-alkene monomer described in the following Table 5 was added to the reactor, the temperature of the reactor was increased to 65° C. and the polymerization was performed for 18 hours.

After the polymerization was finished, alumina was removed from the polymerization solution by using the filter, and the polymerization solution was precipitated in ethylene or hexane. The obtained polymer was dried at the temperature of Tg or less under reduced pressure for 24 hours. The measured physical properties of the manufactured copolymer are described in the following Table 6.

carboxylic group that was the polar group, when the acrylic acid is applied to an optical film, the adhesion property is significantly increased.

EXAMPLE 14

After the high pressure reaction apparatus having the volume of 125 mL of Parr was vacuumed, argon was charged therein. Methyl methacrylate (MMA), maleic anhydride (MAH), and alumina as the Lewis acid were added to the reactor under the argon atmosphere. In addition, AIBN that was the initiator dissolved in toluene was added thereto. Subsequently, ethylene was charged under 35 bar, the temperature of the reactor was increased to 65° C. and the polymerization was performed for 18 hours.

TABLE 5

|  | Reaction addition amount | Lewis acid | | Monomer addition amount | | | | Initiator | Polymerization condition | |
|---|---|---|---|---|---|---|---|---|---|---|
|  | [solvent]/[monomer] | [alumina]/[MMA] | [zirconium oxide]/[MMA] | [MAA]/[MMA] | [1-butene]/[MMA] | [1-hexene]/[MMA] | [1-decene]/[MMA] | [AIBN]/[monomer] | Temperature (° C.) | Time (h) |
|  | (volume ratio) | (molar ratio) | (molar ratio) | (molar ratio) | (molar ratio) | (molar ratio) | (molar ratio) | (molar ratio) |  |  |
| Example 10 | 9 | 1 | — | 0.1 | 5 | — | — | 0.002 | 65 | 18 |
| Example 11 | 6 | 1 | — | 0.1 | — | 3 | — | 0.002 | 65 | 18 |
| Example 12 | 9 | — | 1 | 0.1 | — | 3 | — | 0.002 | 65 | 18 |
| Example 13 | 9 | 1 | — | 0.1 | — | — | 3 | 0.002 | 65 | 18 |

In Table 5, [monomer] means a volume or a mole number of MMA+MAA.

TABLE 6

|  | Polymer composition ratio (mole %) | | | Physical properties | | | | |
|---|---|---|---|---|---|---|---|---|
|  | MMA | 1-alkene | MAA | Tg (° C.) | Mn | Mw | PDI | Transparency (%) |
| Example 10 | 74 | 9 | 17 | 138 | 96500 | 172000 | 1.78 | 90 |
| Example 11 | 71 | 17 | 12 | 120 | 56700 | 84000 | 1.68 | 90 |
| Example 12 | 74 | 12 | 14 | 131 | 64500 | 96600 | 1.79 | 89 |
| Example 13 | 66 | 15 | 19 | 103 | 102000 | 165000 | 1.61 | 89 |

In the case of methyl methacrylate having the highest glass transition temperature among the acrylate vinyl monomers, the glass transition temperature is generally 110° C. from the homopolymerization. In order to overcome the disadvantage of breaking of the film during the formation of the film, ethylene is added to the acrylate polymer as the comonomer. In this case, there is a problem in that the heat resistance is reduced. However, in order to endure heat during the processing, it is required that the glass transition temperature is 100° C. or more. Accordingly, the problem can be solved by adding the acrylic acid. In addition, since the acrylic acid includes the After the polymerization was finished, alumina was removed from the polymerization solution by using the filter, and the polymerization solution was precipitated in ethanol or hexane. The obtained polymer was dried at the temperature of Tg or less under reduced pressure for 24 hours.

EXAMPLE 15

The polymerization was performed by using the same method as Example 14, except that the amount of solvent was controlled.

EXAMPLE 16

The polymerization was performed by using the same method as Example 14, except that the mixed solvent of toluene/THF=3 (volume ratio) was used as the solvent.

EXAMPLE 17

The polymerization was performed by using the same method as Example 14, except that the mixed solvent of hexane/THF=3 (volume ratio) was used as the solvent.

EXAMPLES 18 TO 20

Tetrahydrofurane (THF) was used as the solvent, the polymerization was performed under the conditions in which the amount of the solvent, the temperature, and time were the same as those of Example 14 but the type of metal oxides was changed.

The polymerization conditions and the results of Examples 14 to 20 are described in Tables 7 and 8. In addition, FIG. 7 illustrates the differential scanning calorimetry (DSC) graph of an ethylene-methyl methacrylate-maleic acid anhydride random copolymer that is obtained in Examples 14 and 19, FIG. 8 illustrates the gel permeation chromatography (GPC) analysis results of an ethylene-methyl methacrylate-maleic anhydride random copolymer that is obtained in Example 15, FIG. 9 illustrates the UV-Visible spectrum analysis results of the film that is produced by using an ethylene-methyl methacrylate-maleic anhydride random copolymer that is obtained in Example 18, FIG. 10 illustrates the gel permeation chromatography (GPC) analysis results of an ethylene-methyl methacrylate-maleic anhydride random copolymer that is obtained in Example 19, FIG. 11 illustrates the IR spectrum analysis results of an ethylene-methyl methacrylate-maleic anhydride random copolymer that is obtained in Example 20.

TABLE 7

|  | | | Reaction addition amount | | | | | Polymerization condition | |
|---|---|---|---|---|---|---|---|---|---|
|  | Type of solvent | [Solvent]/ [MMA] (volume ratio) | Type of Lewis acid | [Lewis acid]/[MMA] (molar ratio) | [Initiator]/[MMA] (molar ratio) | [MAH]/[MMA] (molar ratio) | Ethylene pressure (bar) | Temperature (° C.) | Time (h) |
| Ex. 14 | Toluene | 10 | Alumina | 1 | 0.002 | 0.25 | 35 | 65 | 18 |
| Ex. 15 | Toluene | 6 | Alumina | 1 | 0.002 | 0.25 | 35 | 65 | 18 |
| Ex. 16 | Toluene/THF | 10 | Alumina | 1 | 0.002 | 0.25 | 35 | 65 | 18 |
| Ex. 17 | Hexane/THF | 10 | Alumina | 1 | 0.002 | 0.25 | 35 | 65 | 18 |
| Ex. 18 | THF | 6 | boron oxide | 1 | 0.001 | 0.3 | 35 | 70 | 6 |
| Ex. 19 | THF | 6 | Titanium oxide | 1 | 0.001 | 0.3 | 35 | 70 | 6 |
| Ex. 20 | THF | 6 | Zeolite | 1 | 0.001 | 0.5 | 35 | 70 | 6 |

In Example 16, the mixed solvent of toluene/THF=3 was used, in Example 17, the mixed solvent of hexane/THF=3 was used.

TABLE 8

|  | Composition of polymer | | | Physical properties of polymer | | | | |
|---|---|---|---|---|---|---|---|---|
|  | MAH content (mol %) | MMA content (mol %) | Ethylene content (mol %) | Tg (° C.) | Light transmittance (% T) | Mw | PDI | $Td_{50}$ (° C.) |
| Ex. 14 | 23 | 62 | 15 | 120.9 | 89 | 303000 | 2.91 | 423.4 |
| Ex. 15 | 22 | 66 | 12 | 122.8 | 89 | 813000 | 2.93 | 400.7 |
| Ex. 16 | 19 | 63 | 18 | 118.7 | 90 | 220100 | 2.38 | 430.2 |
| Ex. 17 | 20 | 65 | 15 | 125.7 | 91 | 456200 | 2.77 | 404 |
| Ex. 18 | 31 | 50 | 19 | 132.5 | 92 | 173000 | 2.1 | 431 |
| Ex. 19 | 28 | 51 | 21 | 138.1 | 90 | 196000 | 1.7 | 422 |
| Ex. 20 | 39 | 47 | 14 | 141.9 | 91 | 181000 | 1.91 | 418 |

As the results of Examples 14 to 20, the ethylene-methyl methacrylate-maleic anhydride copolymer having the glass transition temperature of about 120° C. or more was synthesized. The low glass transition temperature problem that was the disadvantage of the high transparent film synthesized in Comparative Example was solved, and the 50% thermal decomposition temperature that was measured by the TGA was 400° C. or more which was high. As the content of the ethylene was increased, the glass transition temperature was reduced, and as the content of maleic anhydride and acrylate was increased, the glass transition temperature was increased. Thus, the polymer having the desired heat resistance and physical properties can be synthesized according to the change in polymerization condition.

As the results of Examples 18 to 20, various metal oxides are applied, and in the case of when tetrahydrofuran was used as the solvent, the solubility of the polymer formed was higher than the case of when the toluene was used, thus, the molecular weight distribution was narrow.

EXAMPLES 21 TO 24

The polymerization was performed by using the same method as Examples 14 to 20, and two types or more of acrylates were used to perform 4-membered copolymerization. Alkyl acrylate or glycidyl methacrylate which was substituted with the epoxy group was used as the fourth monomer. That is, in addition to methyl methacrylate, maleic anhydride, and ethylene, methyl acrylate (MA), ethyl acrylate (EA), and glycidyl methacrylate (GMA) were added as the monomer to perform 4-membered copolymerization. The detailed polymerization conditions and the results of Examples 21 to 24 are described in Tables 9 and 10. In addition, FIG. 12 illustrates the differential scanning calorimetry (DSC) analysis results of an ethylene-methyl methacrylate-maleic acid anhydride-glycidyl methacrylate random copolymer that is obtained in Example 21.

TABLE 9

| | | | Reaction addition amount | | | | Polymerization condition | |
|---|---|---|---|---|---|---|---|---|
| | [THF]/[MMA] (volume ratio) | [Lewis acid]/[MMA] (molar ratio) | [Initiator]/[MMA] (molar ratio) | [MAH]/[MMA] (molar ratio) | Ethylene pressure (bar) | [4th monomer]/[MMA] (molar ratio) | Temperature (° C.) | Time (h) |
| Ex. 21 | 3 | Alumina 0.5 | 0.001 | 0.3 | 30 | MA 0.1 | 70 | 6 |
| Ex. 22 | 3 | Alumina 0.5 | 0.001 | 0.3 | 30 | MA 0.2 | 70 | 6 |
| Ex. 23 | 3 | Alumina 0.5 | 0.001 | 0.3 | 30 | EA 0.2 | 70 | 6 |
| Ex. 24 | 3 | Alumina 0.5 | 0.001 | 0.3 | 30 | GMA 0.2 | 70 | 6 |

TABLE 10

| | Composition of polymer | | | | Physical properties of polymer | | | | |
|---|---|---|---|---|---|---|---|---|---|
| | MAH content (mol %) | MMA content (mol %) | Ethylene content (mol %) | 4th monomer content (mol %) | Tg (° C.) | Light transmittance (% T) | Mw | PDI | $Td_{50}$ (° C.) |
| Ex. 21 | 28 | 43 | 9 | MA 6 | 132 | 91 | 235000 | 1.8 | excellent |
| Ex. 22 | 26 | 47 | 11 | MA 10 | 125 | 91 | 217000 | 1.9 | excellent |
| Ex. 23 | 24 | 56 | 10 | EA 10 | 118 | 90 | 251000 | 1.9 | excellent |
| Ex. 24 | 27 | 50 | 11 | GMA 12 | 158 | 90 | 313000 | 2.2 | fair |

The film properties were obtained by measuring the degree of breaking when the film was bent after the polymer was dissolved in THF and the casted film was dried at 70° C. for 1 day. The property was excellent in the case of when the breaking occurs two times or less when the film was bent ten times, and the property was fair in the case of when the breaking occurs five times or less when the film was bent ten times.

As the polymerization results of Examples 21 to 24, when alkyl acrylate was used as the fourth monomer, the properties of the film were more improved. When a small amount of alkyl acrylate was added, it was confirmed that it improved the breaking property in conjunction with ethylene, and as compared to Examples 18 to 20, the molecular weight was increased.

Formation of the Protective Film

The film formation was performed in respect to the copolymers, the protective film was produced and evaluated. The copolymers that were obtained in Comparative Examples and Examples were dissolved in tetrahydrofurane (THF) in an amount of 30% by weight, and left for one day in order to remove gas in the solution. The obtained polymer solution was coated on the glass substrate and the film formation was performed at a predetermined rate by using film regulating devices disposed at an interval of 400 μm and the drying was performed in the oven at 50° C. It was confirmed that the thickness of the film was 80 μm after the drying.

(Measurement of the Thermal Expansion Coefficient)

While the produced optical film specimen was heated by using the TMA (Mettler Toledo) at a rate of 10° C. per min, the dimensional change was measured, and the thermal expansion coefficient was calculated at a slope in the range of 40° C. to 80° C.

(Measurement of the Water Permeability)

The water permeability was measured by using the water permeability measuring device (PERMATRAN-W Model 398, manufactured by Mocon, Co., Ltd.) under the condition of 40° C./100% RH.

(Measurement of the Retardation)

The in-plane retardation Rin and the thickness retardation Rth of the produced optical film were measured by using the Polarimeter (Axoscan) manufactured by Axometrics, Co., Ltd. Each of the retardations was defined by the following equation.

$$Rin=(nx-ny)\times d, Rth=(nz-ny)\times d$$

wherein nx, ny, and nz mean the refractive indices according to the direction and d means a thickness of the film.

(Measurement of the Photoelastic Coefficient)

The spring type of stretching device was provided in Axoscan to apply the stretching force to the protective film and measure the in-plane retardation, thus measuring the photoelastic coefficient.

The physical properties measurement results of the produced optical film are described in the following Table 11. As Comparative Example, physical properties of the TAC film (Fuji film) were compared (Comparative Example 4).

TABLE 11

|  | Rin (nm) | Rth (nm) | photoelastic coefficient ($10^{-12}$ m²/N) | Thermal expansion coefficient (ppm/K) | Water permeability (g/(m² day)) |
| --- | --- | --- | --- | --- | --- |
| Comparative Example 1 | 0.1 | 2.0 | −3.2 | 113 | 76 |
| Comparative Example 2 | 0.4 | 2.0 | −0.5 | 68.6 | 220 |
| Comparative Example 4 | 1.0 | −50.0 | 12.7 | 57 | 720 |
| Example 5 | 0.0 | 2.7 | −0.6 | 71 | 200 |
| Example 6 | 0.1 | 1.2 | −0.6 | 72 | 211 |
| Example 7 | 0.3 | 3.4 | −0.5 | 87 | 203 |
| Example 8 | 0.6 | 2.5 | −0.6 | 81 | 207 |
| Example 11 | 0.4 | 3.6 | −0.5 | 74 | 221 |
| Example 13 | 0.4 | 3.5 | −0.6 | 73 | 217 |
| Example 14 | 0.2 | 3.3 | −0.3 | 64.4 | 197 |
| Example 15 | 0.4 | 4.1 | −0.5 | 65.0 | 198 |
| Example 16 | 0.6 | 2.0 | −0.5 | 65.9 | 201 |
| Example 17 | 0.2 | 2.5 | −0.5 | 66.1 | 181 |
| Example 21 | 0.3 | 2.4 | −0.7 | 65.1 | 179 |
| Example 22 | 0.4 | 3.4 | −0.6 | 65.4 | 191 |
| Example 23 | 0.5 | 4.5 | −0.4 | 66.7 | 189 |

In the case of Examples, the in-plane retardation (Rin) and the thickness retardation (Rth) were largely smaller than those of Comparative Example 5, and the photoelastic coefficient was small, and the water permeability was small. In Comparative Examples 1 and 2, the thermal expansion coefficient was relatively high as compared to other examples or the TAC film (Comparative Example 5).

Production of the Polarizer Plate (Production of the Polarizer)

The polyvinyl alcohol (PVA) film having the thickness of 75 μm (the degree of polymerization: 2400) was dipped in the aqueous solution that included iodine (I2) and potassium iodide (KI), and stretched five-fold. Subsequently, the film was added to the bath including boric acid and potassium iodide aqueous solution, crosslinked, and dried at 80 for 5 min to produce the polarizer.

(Surface Treatment of the Protective Film for Polarizer Film)

In order to improve the adhesion strength of the polarizer, the surface of the protective film for polarizer film was subjected to the corona treatment, and the silane-based primer was coated thereon. 3-aminotrimethoxy silane (Fluka) was dissolved as the silane-based primer in the cosolvent of isopropyl alcohol and water (95/5 weight ratio) in an amount of 2%, and agitated for 24 hours. The coating was performed on the surface of the corona treated protective film by using a wire bar (#5) and drying was performed at 60° C. in an oven for 10 min. In the case of the TAC film of Comparative Example 5, the film was dipped in the sodium hydroxide aqueous solution of 15% by weight for 5 min and dried at 60° C. in the oven for 10 min to perform the surface treatment.

(Production of the Adhesive, and the Polarizer Plate)

Polyvinyl alcohol including the acetoacetyl group (5%) (average polymerization degree 2000, saponification degree 94%) was dissolved in pure water to produce the 3.8% aqueous solution. Zirconium amine compound (AC-7, Daichi Kigenso Kagaku Kogyo) was dissolved in pure water to produce the 3.8% aqueous solution. The zirconium amine compound aqueous solution was added in a ratio of 20 parts by weight based on 100 parts by weight of polyvinyl alcohol to the produced polyvinyl alcohol aqueous solution, agitated, and mixed. The 1M hydrochloric acid aqueous solution was added to the mixed solution to control the pH to 8.5, thus producing the adhesive.

The films were laminated on both sides of the polyvinyl alcohol polarizer as the protective film by means of the copolymers of Comparative Examples and Examples by using the produced adhesive, dried at 80° C. in the oven for 10 min, and attached to produce the polarizer plate.

(Evaluation of the Optical Properties)

The single and crossed transmittances of the polarizer plate produced were measured by using the n&k spectrometer (n&k Technology).

Physical properties of the produced polarizer plate were measured and the results are described in the following Table 12.

TABLE 12

| Used protective film material | Single transmittance (%) | Crossed transmittance (%) |
|---|---|---|
| Comparative Example 1 | 42.3 | 0.012 |
| Comparative Example 2 | 42.2 | 0.012 |
| Comparative Example 4 | 42.4 | 0.011 |
| Example 5 | 41.8 | 0.014 |
| Example 6 | 42.6 | 0.013 |
| Example 7 | 41.9 | 0.015 |
| Example 8 | 41.7 | 0.013 |
| Example 11 | 42.3 | 0.016 |
| Example 13 | 42.4 | 0.016 |
| Example 14 | 42.3 | 0.015 |
| Example 15 | 42.4 | 0.013 |
| Example 16 | 42.4 | 0.014 |
| Example 17 | 42.2 | 0.012 |
| Example 21 | 42.3 | 0.012 |
| Example 22 | 42.1 | 0.013 |
| Example 23 | 42.2 | 0.015 |

There was not significant difference in the polarizing characteristics after the polarizer plate was produced in respects to Comparative Example in which the TAC film was applied.

The invention claimed is:

1. An optical film including a copolymer comprising:
   (a) 0.1-30 mole % of an alkene monomer selected from the group consisting of ethylene, propylene, 1-butene, 1-pentene, 1-hexene, 1-hepthene, 1-octene, 1-nonene, 1-decene, 2-butene, 2-pentene, 2-hexene, 3-hexene, 2-hepthene, 2-octene and 2-nonene;
   (b) 30-99 mole % of an acrylate monomer; and
   (c) 0.1-50 mole % of at least one of an unsaturated organic acid monomer and an unsaturated acid anhydride monomer having one or more double bonds, and
   wherein a glass transition temperature (Tg) of the copolymer is in the range of 100-220° C.

2. The optical film as set forth in claim 1, wherein the acrylate monomer includes a compound that is represented by the following Formula 1:

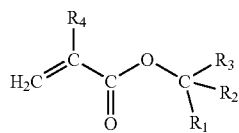

wherein $R_1$, $R_2$ and $R_3$ are each independently a hydrogen atom or a monovalent hydrocarbon group that is capable of including a hetero atom and has 1 to 30 carbon atoms, at least one of $R_1$, $R_2$ and $R_3$ optionally is an epoxy group, and $R_4$ is a hydrogen atom or an alkyl group having 1 to 6 carbon atoms.

3. The optical film as set forth in claim 1, wherein the unsaturated organic acid monomer is a monovalent carboxylic acid or a polyvalent carboxylic acid.

4. The optical film as set forth in claim 1, wherein the unsaturated acid anhydride monomer is a monovalent carboxylic acid or a polyvalent carboxylic acid.

5. The optical film as set forth in claim 1, wherein a number average molecular weight of the copolymer is in the range of 5,000 to 400,000 and a weight average molecular weight of the copolymer is in the range of 10,000 to 800,000.

6. The optical film as set forth in claim 1, wherein in the copolymer, a temperature ($Td_{50}$) at which 50% of an initial weight is reduced is in the range of 350 to 550° C.

7. The optical film as set forth in claim 1, wherein the copolymer is produced by using a process including polymerizing the monomers (a) to (c) in the presence of a Lewis acid or a metal oxide using a radical polymerization initiator.

8. A protective film for a polarizer film that is formed of the optical film according to claim 1.

9. The protective film for a polarizer film as set forth in claim 8, wherein at least one surface is subjected to the adhesion strength improvement treatment.

10. The protective film for a polarizer film as set forth in claim 9, wherein the adhesion strength improvement treatment includes one or more selected from the group consisting of corona treatment, plasma treatment, UV treatment, and primer layer formation.

11. A polarizer plate comprising:
   a polarizer; and
   a protective film that is provided on at least one side of the polarizer,
   wherein the protective film is the protective film for polarizer film according to claim 8.

12. The polarizer plate as set forth in claim 11, wherein an adhesive layer is provided between the polarizer and the protective film.

13. The polarizer plate as set forth in claim 11, further comprising:
   a pressure sensitive adhesive layer on at least one surface.

14. A complex polarizer plate in which at least one optical layer selected from the group consisting of a retardation plate, a light diffusion plate, a viewing angle expansion plate, a luminance improvement plate, and a reflection plate is layered on the polarizer plate of claim 11.

15. An image display device comprising:
   the polarizer plate of claim 11.

16. The image display device as set forth in claim 15,
   the image display device includes a light source, a first polarizer plate, a liquid crystal cell, and a second polarizer plate that are sequentially layered,
   wherein at least one of the first polarizer plate and the second polarizer plate is the polarizer plate of claim 15, and
   wherein the liquid crystal cell has a mode selected from the group consisting of an In-Plane Switching mode (IPS mode), a Vertically Aligned mode (VA mode), an OCB mode (Optically Compensated Birefringence mode), a Twisted Nematic mode (TN mode), and a Fringe Field Switching mode (FFS mode).

* * * * *